United States Patent
Watanabe et al.

[11] Patent Number: 5,947,865
[45] Date of Patent: Sep. 7, 1999

[54] LOCK-UP CONTROL SYSTEM FOR CONTROLLING LOCK-UP CLUTCH EMPLOYED IN A TORQUE CONVERTER

[75] Inventors: Akira Watanabe, Kanagawa; Kazutaka Adachi, Yokohama; Ken Ito, Tokyo, all of Japan

[73] Assignee: Nissan Motor Co., Ltd., Yokohama, Japan

[21] Appl. No.: 08/964,115

[22] Filed: Nov. 5, 1997

[30] Foreign Application Priority Data

Nov. 7, 1996 [JP] Japan .................................. 8-294913

[51] Int. Cl.⁶ ........................................... F16H 61/14
[52] U.S. Cl. ........................... 477/169; 477/174; 701/68
[58] Field of Search ................... 477/166, 168, 477/169, 174, 175; 701/67, 68

[56] References Cited

U.S. PATENT DOCUMENTS

| | | | |
|---|---|---|---|
| 4,562,905 | 1/1986 | Nishimura et al. | 192/0.032 |
| 4,706,790 | 11/1987 | Lockhart et al. | 477/169 X |
| 5,029,087 | 7/1991 | Cowan et al. | 477/169 X |
| 5,121,820 | 6/1992 | Brown et al. | 477/65 X |
| 5,318,159 | 6/1994 | Kashiwabara | 477/169 |
| 5,527,238 | 6/1996 | Hrovat et al. | 477/169 X |
| 5,609,551 | 3/1997 | Sakai | 477/168 |
| 5,616,099 | 4/1997 | Sakai | 477/169 |
| 5,667,458 | 9/1997 | Narita et al. | 477/169 |
| 5,697,867 | 12/1997 | Kono et al. | 477/176 |
| 5,719,768 | 2/1998 | Tashiro et al. | 477/169 X |

FOREIGN PATENT DOCUMENTS

8-21526  1/1996  Japan.

Primary Examiner—Charles A. Marmor
Assistant Examiner—Scott Lund
Attorney, Agent, or Firm—Foley & Lardner

[57] ABSTRACT

A control system for controlling a lock-up clutch of a torque converter employed in an automatic transmission of a vehicle, the lock-up clutch being controllable by a pressure differential between apply and release pressures comprises a detector for detecting a demand of change (decrease/increase) in the pressure differential, a pressure-differential setting circuit for setting a target pressure differential in response to the demand of change in the pressure differential, and a pressure-differential filter having a desired dynamic characteristic and being responsive to the target pressure differential for outputting a filtered pressure-differential command value via a filtering process based on the desired dynamic characteristic. A pressure-differential regulation circuit is connected to the pressure-differential filter for receiving the filtered pressure-differential command value as an input information data to generate an output indicative of a duty ratio to be output to a lock-up solenoid valve and for regulating the pressure differential in accordance with the duty ratio.

7 Claims, 8 Drawing Sheets

LOCK-UP CONTROL SYSTEM FOR CONTROLLING LOCK-UP CLUTCH EMPLOYED IN A TORQUE CONVERTER

The contents of Application No. TOKUGANHEI 8-294913, filed Nov. 7, 1996, in Japan is hereby incorporated by reference.

BACKGROUND OF THE INVENTION

1. Field of the Invention

The present invention relates to a lock-up control system for controlling the lock-up clutch of a so-called lock-up torque converter employed in an automatic transmission, and specifically to technologies for optimally increasing or decreasing the pressure differential between the apply and release pressures, each applied to the associated face of the lock-up clutch, often called a lock-up piston, in accordance with the desired automotive-transmission and power-train designer- or the desired transmission specialist-selected dynamic characteristic or transfer characteristic.

2. Description of the Prior Art

For example, this type of lock-up controller has been disclosed in Japanese Patent Provisional Publication No. 8-21526, assigned to the assignee of the present invention. In recent years, many cars are equipped with automatic transmissions with so-called lock-up torque converters which act to mechanically couple the engine crankshaft to the transmission output shaft. As is generally known, the lock-up clutch includes an apply chamber and a release chamber. The lock-up clutch is generally controllable by the pressure differential between the apply pressure in the apply chamber and the release pressure in the release chamber. Today many more cars employing automatic transmissions with so-called lock-up torque converters are designed so that the lock-up clutch is controllable by the pressure differential between the apply and release pressures to operate at either one of three operational zones, namely an open converter zone at which the lock-up clutch Is released, a slip lock-up zone at which the lock-up clutch is partially engaged, and a full lock-up zone at which the lock-up clutch is fully engaged, rather than two modes, namely an open converter zone and a completely lock-up zone. Usually, these zones are determined depending on at least two factors, namely a throttle opening of a throttle valve and a vehicle speed. In modern automotive vehicles employing automatic transmissions with lock-up torque converters, the lock-up clutch tends to be operated in the lock-up zone for example during constant-speed straight-ahead driving in which torque-increase and torque-fluctuation absorbing functions are unnecessary. In order to prevent engine stall and to absorb torque fluctuations, for example when the vehicle is rapidly decelerated from the vehicle coasting state with the lock-up clutch operated at the lock-up zone, the lock-up controller is generally designed to shift the operational mode of the lock-up clutch from the lock-up zone to the open converter zone by varying the previously-noted pressure differential. In this case, there is a great delay of response time from the lock-up zone (the clutch engagement position) to the open converter zone (the clutch release position), if the lock-up clutch is fully engaged. To avoid this or to quickly instantly release the lock-up clutch with a relatively small delay of response time, the previously-noted Japanese Patent Provisional Publication No. 8-21526 teaches the use of the minimum possible capacity (or degree) of engagement of the lock-up clutch which capacity corresponds to a boundary capacity (or a boundary engagement force of the lock-up clutch) between the full lock-up state and the partial lock-up state, when the vehicle is rapidly decelerated from the vehicle coasting state with the lock-up clutch operated at the lock-up zone. The aforementioned lock-up control techniques, however, have not met entirely satisfactory results. The prior art lock-up control system also suffers from the drawback of undesired shock of shifting from one of the lock-up position and the release position to the other.

SUMMARY OF THE INVENTION

Accordingly, it is an object of the invention to provide a lock-up control system for controlling the lock-up clutch of a so-called lock-up torque converter employed in an automatic transmission, which avoids the aforementioned disadvantages of the prior art.

Figure 9:
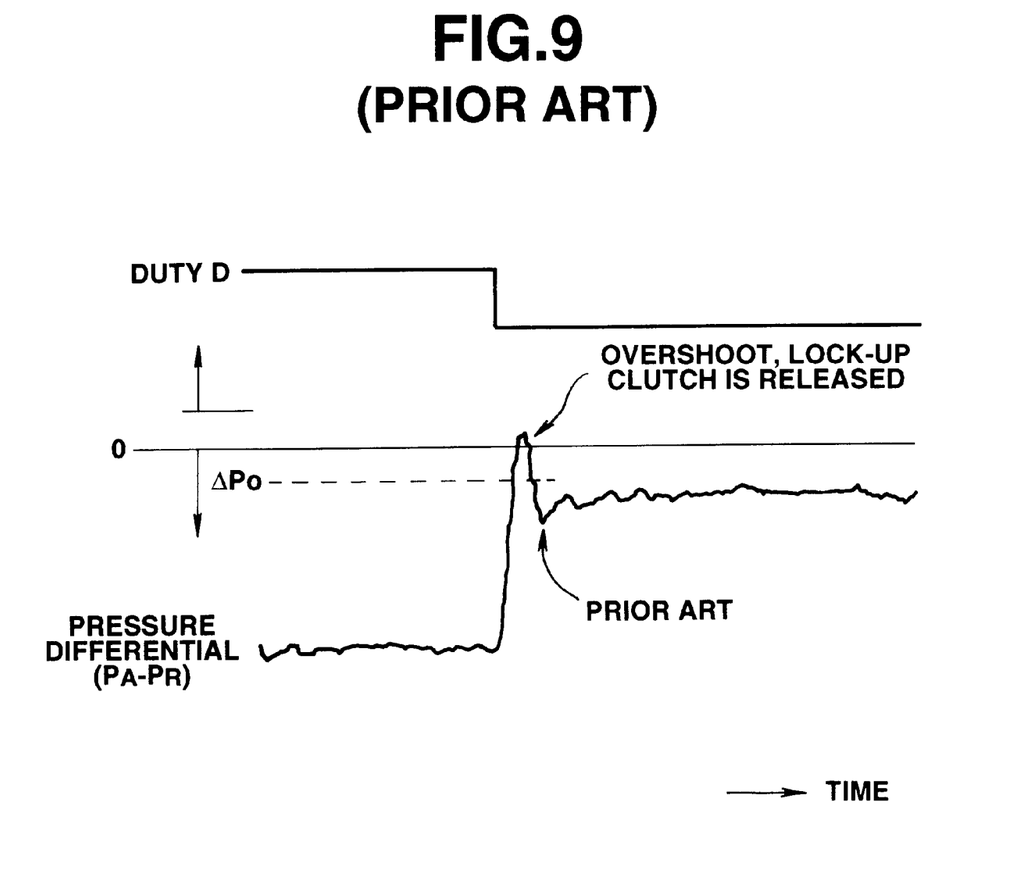
FIG. 9 is a timing chart illustrating an output waveform of the pressure differential ($P_A - P_R$), indicating a step-response characteristic based on a rapid, stepwise drop of the pressure differential toward a predetermined initial pressure differential ($\Delta P_0$) in the prior art system.

To balance at least two contradictory requirements, that is, decrease in response-time delay during the transition period between engagement and release positions of the lock-up clutch, and attenuation of undesired shock which may result from rapid releasing or engaging action of the lock-up clutch in the transition period, it is desirable to rapidly instantly change the pressure differential between the apply and release pressures from the present pressure differential to a predetermined initial pressure differential and then to drop it towards a desired value at a given constant rate-of-change at any time. For instance, during the transition period from the full engagement position to the release position of the lock-up clutch, it is desirable to rapidly instantly decrease the pressure differential from the maximum pressure differential to a predetermined initial pressure differential and then to drop it to a predetermined minimum pressure differential at a given constant rate-of-change at any time, if an instruction for the pressure-differential change, for instance an instruction for clutch releasing action is output from a lock-up control unit or controller under a particular condition where the lock-up clutch is fully engaged under the maximum pressure differential. The predetermined initial pressure differential is set to a given value which is predetermined in such a manner that there is less shock of the lock-up clutch during shifting to its release position. Such a control technique of releasing operation of the lock-up clutch, in which a rapid momentary drop of the pressure differential down to the predetermined initial pressure differential ($\Delta P_0$) is combined with a substantially linear pressure-differential drop to the predetermined minimum pressure differential at a given constant rate-of-change, may contribute to a more rapid and smooth release motion of the lock-up clutch, thus satisfactorily balancing the previously-noted two contradictory requirements, namely attenuation in shock of the lock-up clutch and reduction in response-time delay during releasing action. However, hydraulic circuits employed in the lock-up control systems, each of which is constructed by at least a hydraulic valve (often called a lock-up control valve) and hydraulic pressure lines involving a supply line for the apply pressure and a release line for the release pressure for use in lock-up control, have individual damping characteristics for the pressure differential between the apply and release pressures. As seen in FIG. 9, assuming that a hydraulic circuit for the lock-up control system has an insufficient unmatched damping characteristic for the pressure differential, there is a possibility of undesired overshoot (first transition overshoot) when the pressure differential of the apply and release pressures rapidly and instantly drops from the maximum pressure differential to the predetermined initial pressure differential $\Delta P_0$. In this manner, in the event that overshoot takes place owing to undesired rapid reduction in the pressure differential below the predetermined initial pressure differential $\Delta P_0$, the lock-up clutch may be unintendedly released. In such a case, release shocks may occur owing to undesirable releasing motion of the lock-up clutch at the time of the first transition overshoot. To avoid any overshoot, the initial pressure differential $\Delta P_0$ is able to be programmed at a predetermined high level. However, such a high-level setting of the initial pressure differential $\Delta P_0$ prevents the pressure differential from dropping down to the predetermined minimum pressure differential within an acceptable or admissible response time required for the releasing action of the lock-up clutch. Thus, it is desirable to provide technologies for optimally controlling a pressure differential between the apply and release pressures in a lock-up torque converter, without any undesirable hunting (overshoot) of the system, unacceptable response-time delay, and shock of the lock-up clutch even during quick transition between the engagement and release positions.

In order to accomplish the aforementioned and other objects of the present invention, a control system for controlling a lock-up clutch of a torque converter employed in an automatic transmission of a vehicle, the lock-up clutch being controllable by a pressure differential between an apply pressure which is applied in a direction of engagement of the lock-up clutch and a release pressure which is applied in a direction of release of the lock-up clutch comprises a detector for detecting a demand of change in the pressure differential between apply and release pressures, a pressure-differential setting circuit for setting a target pressure differential in response to the demand of change in the pressure differential, a pressure-differential filter having a desired dynamic characteristic and being responsive to the target pressure differential for outputting a filtered pressure-differential command value via a filtering process based on the desired dynamic characteristic, and a pressure-differential regulation circuit being connected to the pressure-differential filter for receiving the filtered pressure-differential command value as an input information data to generate an output and for regulating the pressure differential in accordance with the output. The pressure-differential filter may comprise an inverse filter whose desired dynamic characteristic is obtained by multiplying a dynamic characteristic of a low-pass filter matched to a desired response characteristic for the pressure differential with an inverse system of a low-pass filter having a dynamic characteristic being approximate to a transfer characteristic of the pressure-differential regulation circuit. Preferably, the pressure-differential setting circuit includes a waveform regulation means for regulating an input waveform of input data of the pressure-differential filter to a pre-programmed input waveform, and a memory means for storing output data of the pressure-differential filter in an associated memory address as a pressure-differential basic command value in every predetermined time interval, the output data being obtained by changing the input data of the pressure-differential filter by a unit quantity. It is preferable that the input waveform of input data of the pressure-differential filter is regulated to a stepped input waveform. Also, a damping factor of the desired dynamic characteristic of the pressure-differential filter may be determined so that a transfer function of the pressure-differential filter is approximated to a second-order transfer function and so that a viscosity coefficient of a transfer function calculated from a power-train designer-selected dynamic characteristic is greater than a viscosity coefficient indicative of a damping factor of a damping characteristic of a transfer function of the lock-up control system. More preferably, the predetermined time interval of the memory means is identical to a time interval of arithmetic calculation of the filtered pressure-differential command value.

DESCRIPTION OF THE PREFERRED EMBODIMENTS

Figure 1:
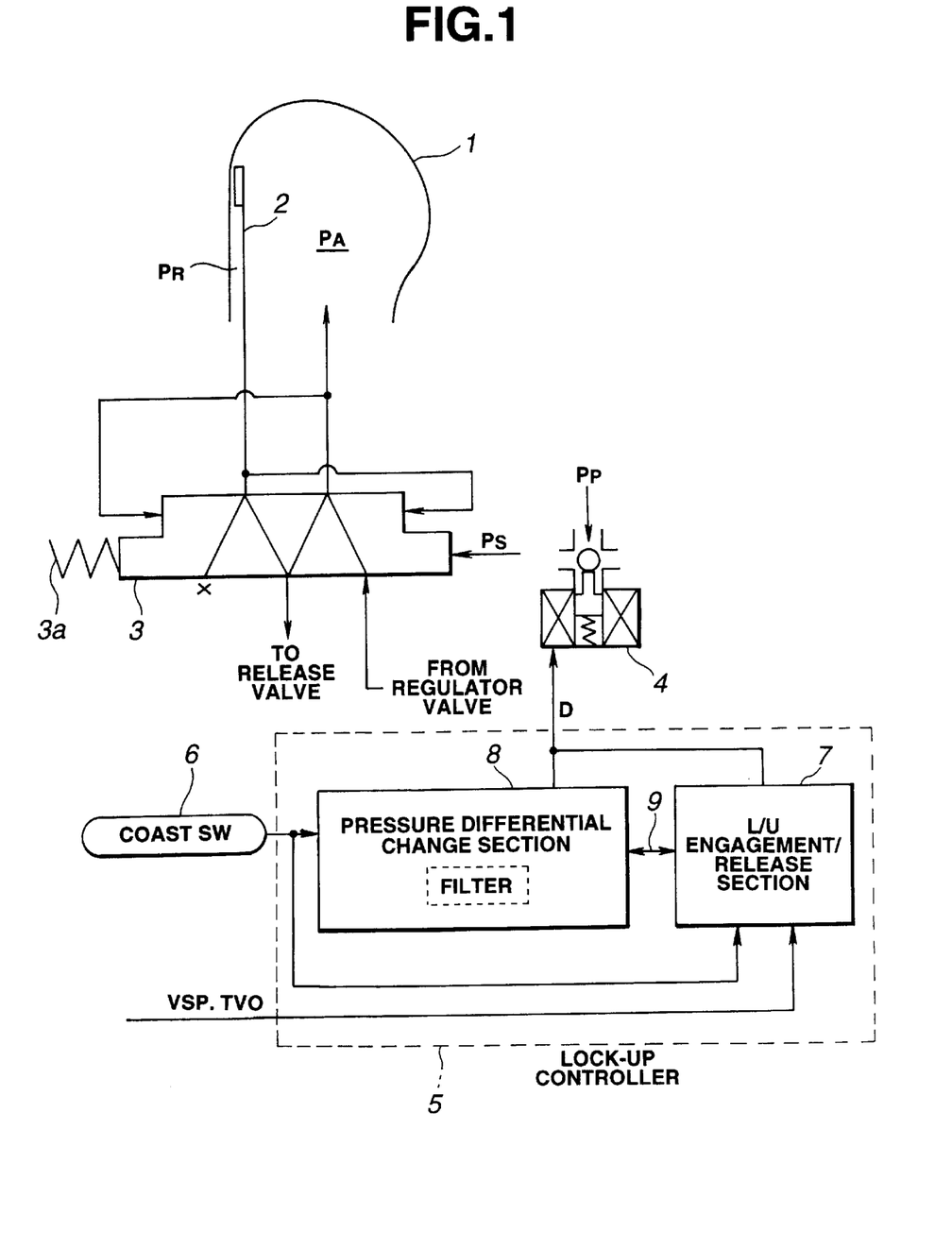
FIG. 1 is an operational diagram illustrating one embodiment of a lock-up control system of the present invention.
Figure 2:
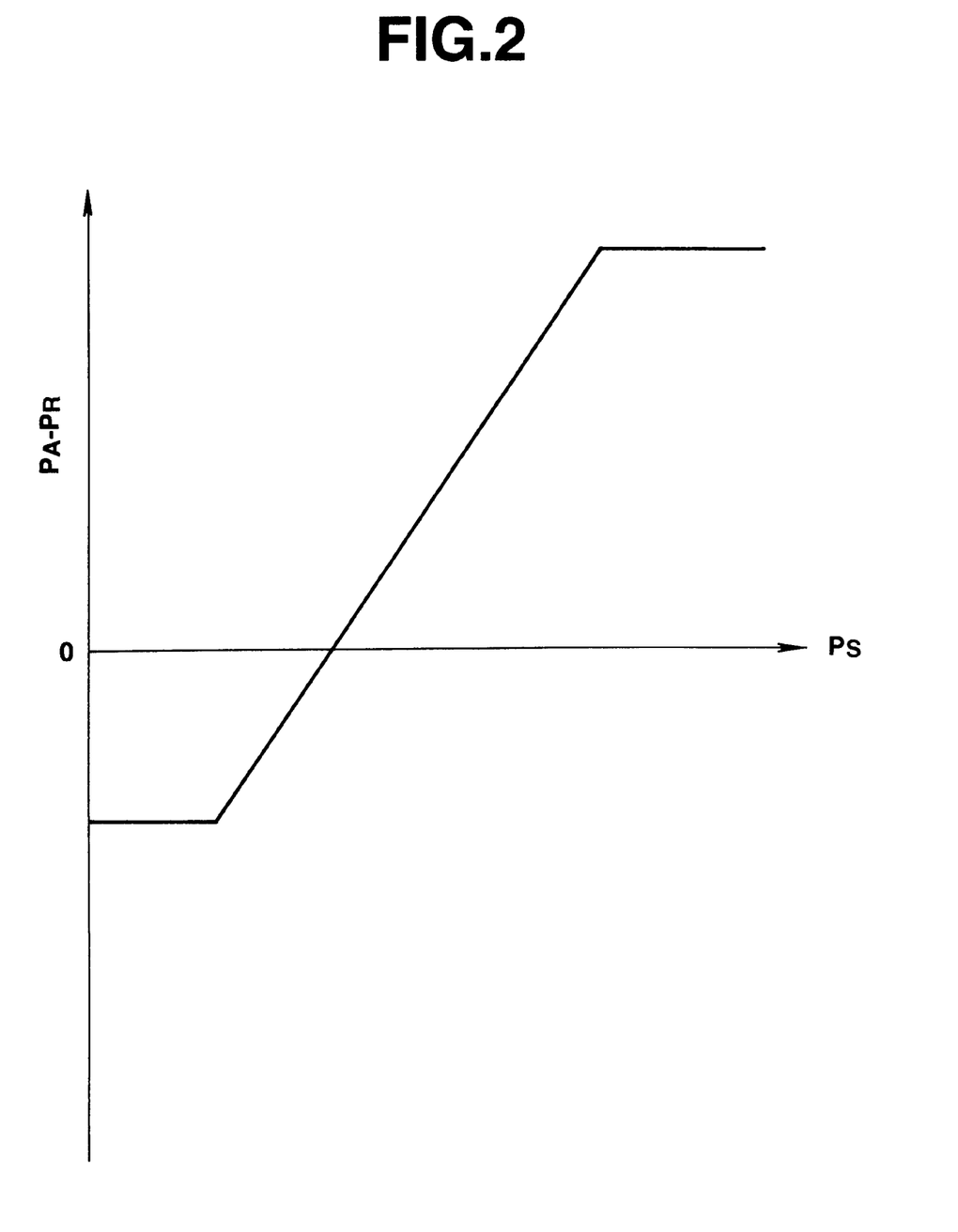
FIG. 2 is a graph illustrating a pressure-differential ($P_A - P_R$) versus signal pressure ($P_S$) characteristic of a lock-up control valve employed in the lock-up controller of the embodiment.
Figure 3:
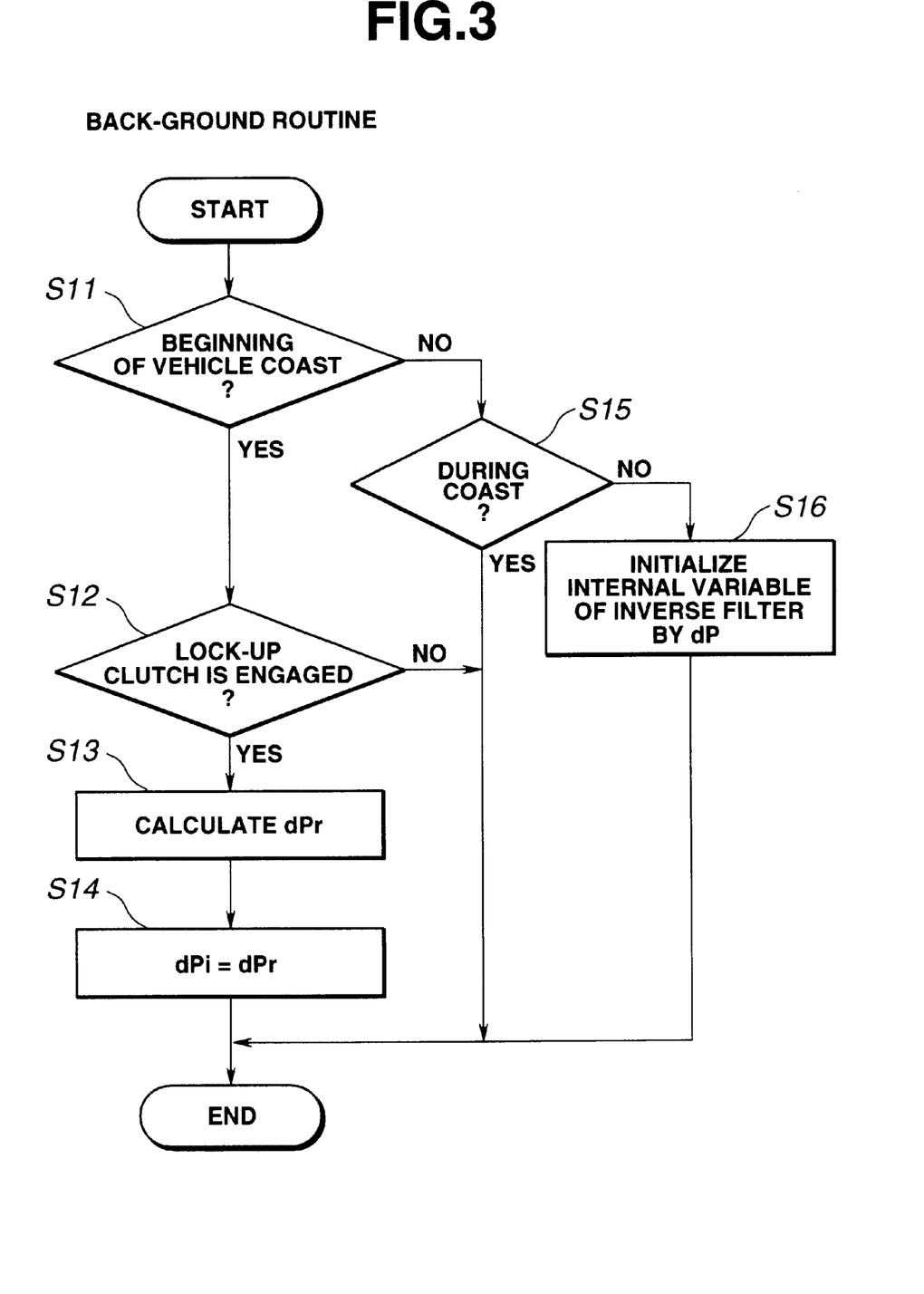
FIG. 3 is a flow chart illustrating a back-ground routine (or a main program) necessary for the pressure-differential regulation operation (reduction in the pressure differential) with respect to the lock-up clutch, which routine is executed by the lock-up controller shown in FIG. 1.
Figure 4:
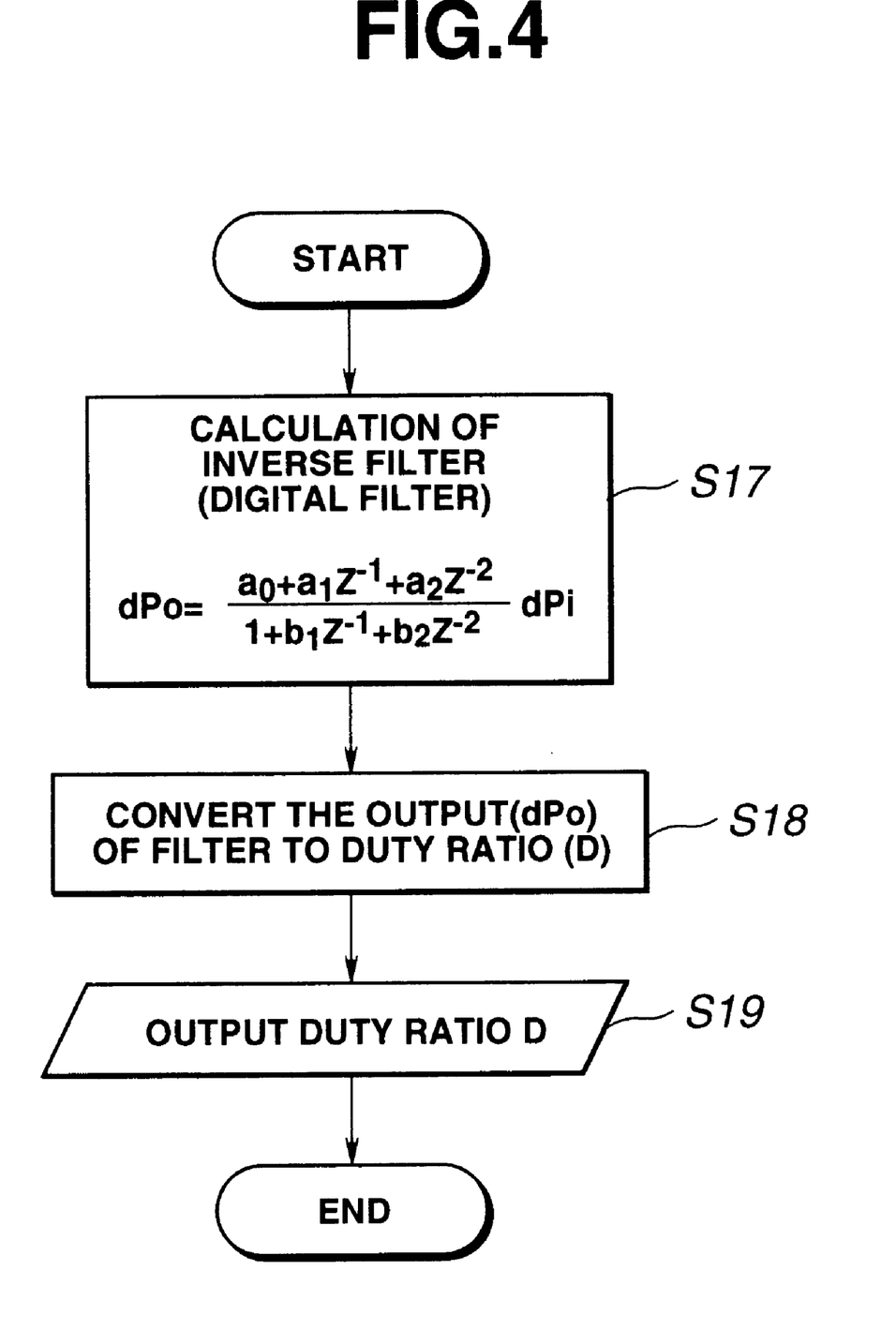
FIG. 4 is a flow chart illustrating a time-triggered interrupt sub-routine executed by the lock-up controller of the embodiment.

Referring now to the drawings, particularly to FIG. 1, a so-called lock-up torque converter is generally indicated by reference numeral 1. The lock-up torque converter 1 couples an internal combustion engine (not shown) with the power train including a transmission (not shown) such as an automatic transmission, a continuously variable transmission (often abbreviated to "CVT") or the like. The lock-up torque converter transmits engine-power output to a transmission input shaft via a working oil (precisely an internal working fluid). The torque converter 1 employs a lock-up clutch 2 which is operatively arranged between a torque-converter input element (e.g., a pump impeller) in driven connection with an engine and a torque-converter output element (e.g., a turbine runner) in driving connection with a power train. As seen in FIG. 1, the lock-up clutch 2 includes an apply chamber to which an apply pressure $P_A$ is applied and a release chamber to which a release pressure $P_R$ is applied. In a conventional manner, the lock-up clutch 2 is controlled in response to the pressure differential ($P_A - P_R$) between the apply and release pressures to operate at either one of three operational zones, namely an open converter zone at which the lock-up clutch is released, a slip lock-up zone at which the lock-up clutch is partially engaged, and a full lock-up zone at which the lock-up clutch is fully engaged. When the lock-up clutch assumes its open converter state (corresponding to a lock-up clutch release position), that is, when the release pressure $P_R$ is held at a level greater than the apply pressure $P_A$, the engine crankshaft and the transmission output shaft are coupled via an internal working fluid in the torque converter in normal operation. On the contrary, when the lock-up clutch assumes its fully locked-up state (corresponding to a full lock-up position), the engine crankshaft and the transmission output shaft are directly completely coupled to each other by a mechanical connection (via the lock-up clutch partially or fully engaged), thus disabling, or fully locking up the torque converter. When the lock-up clutch assumes its partial locked-up state (corresponding to a slip lock-up position), the engine crankshaft and the transmission output shaft are coupled to each other with slight slip of the lock-up clutch (with the clutch partially engaged), thus partially locking up the torque converter. In more detail, the lock-up clutch 2 begins to engage from the time when the release pressure $P_R$ becomes less than the apply pressure $P_A$. Thus, the engagement force of the lock-up clutch 2 is determined depending on the pressure differential $(P_A - P_R)$ between the apply and release pressures. The engagement force of the lock-up clutch will be hereinafter referred to as a "lock-up capacity". Ordinarily, the greater the pressure differential $(P_A - P_R)$, the greater the lock-up clutch engagement force (or the lock-up capacity). As can be appreciated from FIGS. 1 and 2, actually, the pressure differential $(P_A - P_R)$ is controlled or regulated by means of a well-known lock-up control valve 3. As seen in FIG. 1, in the shown embodiment, the lock-up control valve 3 includes a standard pilot-pressure operated spool valve. As an internal pilot pressure the apply pressure $P_A$ acts in one axial direction (to the rightward axial direction in FIG. 1) of the spool slidably accommodated in the control valve 3, whereas as the other internal pilot pressure the release pressure $P_R$ acts in the opposing direction (to the leftward axial direction in FIG. 1). Also, a spring 3a is provided to bias the spool of the control valve 3 in the direction of the apply pressure $P_A$ acting on the one spool end of the control valve 3. In FIG. 1, a pressure denoted by $P_S$ corresponds to an external pilot pressure acting on the other spool end (i.e., in the leftward axial direction) of the control valve 3. The external pilot pressure $P_S$ corresponds to an output signal pressure which is generated from an electromagnetic solenoid valve 4, often called a lock-up solenoid valve, to the lock-up control valve 3. The axial position of the spool of the control valve 3 is changeable depending on the balance among the apply pressure $P_A$ acting on the one valve-spool end, the release pressure $P_R$ acting on the other valve-spool end, the spring bias of the spring 3a, and the signal pressure $P_S$ from the lock-up solenoid valve 4. The lock-up control valve 3 incorporated in the control system of the embodiment exhibits a specified differential-pressure $(P_A - P_R)$ versus signal pressure $(P_S)$ characteristic. For an example of the differential pressure versus signal pressure characteristic, see FIG. 2. On the other hand, the lock-up solenoid valve 4 is comprised of a standard duty-cycle controlled solenoid valve. The lock-up solenoid valve 4 is connected to a fluid-pressure source (i.e., a hydraulic pump) to receive a pump pressure $P_p$ via its inlet port and is also connected to the lock-up control valve 3 to provide the output signal pressure $P_S$ via its outlet port. As seen in FIG. 1, when the solenoid valve 4 is de-energized and thus maintained at its spring-loaded position, fluid communication between the inlet and outlet ports of the solenoid valve 4 is blocked. On the contrary, when the electromagnetic solenoid of the solenoid valve 4 is energized, the previously-noted fluid communication is established. The de-energized and energized states of the solenoid valve 4 are controlled through a duty-ratio control or a duty-cycle control. Thus, the output signal pressure $P_S$ can be adjusted or regulated in response to a controlled duty ratio D for the solenoid valve 4. A drive signal of a controlled duty ratio D is generated from a lock-up controller 5 to the lock-up solenoid valve 4, thus ensuring the control or regulation of the pressure differential $(P_A - P_R)$. Usually, the lock-up controller 5 comprises a microcomputer. For instance, the microcomputer is generally constructed by an input interface circuit including an analog-to-digital (A/D) converter for converting an analog input information or data, such as each sensor signal from various vehicle sensors, to a digital signal, a central processing unit (CPU), memories (ROM, RAM) for storing programs necessary to controlling engagement or release of the lock-up clutch and the pressure-differential reduction program (the time-triggered-interrupt sub-routine) executed by the CPU, and for permanently storing a predetermined, programmed information and for temporarily storing the results of ongoing arithmetic calculations, and an output interface circuit generally including a digital-to-analog (D/A) converter and a special driver to handle or drive a larger load, that is, the electromagnetic solenoid employed in the lock-up solenoid valve 4. The previously-noted input and output interface circuits can be constructed individually, or in lieu thereof integrally formed as an input/output interface unit. The input interface of the lock-up controller 5 receives a signal from a coast switch 6. The coast switch 6 generates a specific signal (a switched-ON signal) depending on the engine/vehicle operating condition such as during vehicle coasting state in which engine brake is acting. On the contrary, the coast switch 6 is turned OFF during driving without any engine brake. The input interface of the lock-up controller 5 receives a vehicle-speed indicative signal VSP from a vehicle speed sensor and a throttle opening indicative signal TVO from a throttle opening sensor. These signals VSP and TVO are generally used as input data reflecting the engine/vehicle operating conditions. The previously-explained three operational zones (namely the open converter zone, the slip lock-up zone and the full lock-up zone) are traditionally predetermined depending upon the two operating parameters, the vehicle speed VSP (approximately equivalent to a transmission output shaft rotational speed) and the throttle opening TVO of the throttle valve. The vehicle speed indicative signal VSP is generated from a standard vehicle speed sensor which is generally located at either the transmission or the transaxle (in front-wheel drive vehicles) to monitor the output shaft speeds of the road wheels. The throttle opening indicative signal TVO is traditionally generated from a standard throttle position sensor which is generally located on the throttle body and connected to the throttle shaft to monitor the throttle opening such as a throttle angle. As seen in FIG. 1, the lock-up controller 5 of the embodiment includes a lock-up engagement/release section 7 which is provided to execute a usual lock-up clutch control based on the vehicle speed indicative signal value VSP and the throttle opening indicative signal value TVO. The lock-up controller 5 also includes a pressure-differential change section 8 which is suitable to transient engine/vehicle operating conditions such as during the beginning period of vehicle coasting and is provided for executing the pressure-differential control routines as shown in FIGS. 3 and 4, or in FIGS. 5 and 6, for the purpose of ensuring a desired dynamic characteristic of the system. The lock-up engagement/release section 7 communicates through a data link 9 (signal lines commonly known either as data buses or address buses) with the pressure-differential change section 8 to transmit or transfer informational signal data (corresponding to the previously-discussed lock-up capacity) from one of the two sections 7 and 8 to the other. The pressure-differential change section 8 performs the pressure-differential ($P_A-P_R$) change control (which will be fully described later by reference to the flow charts shown in FIGS. 3 and 4 or to the flow charts shown in FIGS. 5 and 6), on the basis of the input information data generated from the coast switch 6 and the input information data (the lock-up capacity) drawn from the lock-up engagement/release section 7.

Referring now to FIG. 3, there is shown the main program (the back-ground routine) for the pressure-differential ($P_A-P_R$) transient control executed by the system of the embodiment during transition between the engagement and release positions of the lock-up clutch. The control routines shown in FIGS. 3 and 4 are exemplified in a rapid and smooth pressure-differential reduction control during transition to vehicle coasting. In step S11, a test is made to determine whether the engine/vehicle operating condition begins to shift to a vehicle coasting state. Actually, in step S11, a period of the beginning of vehicle coasting (but not vehicle-coasting period) is determined or monitored depending on whether the input signal from the coast switch 6 is changed from an OFF signal to an ON signal during the current execution cycle. When the answer to step S11 is in the affirmative (YES), that is, in a transient state from the vehicle driving to coasting, that is, at the beginning period of vehicle coasting, step S12 occurs. In step S12, a test is made to determine whether the lock-up clutch 2 is in its engaged state, that is, the clutch 2 is operated in one of the slip lock-up zone and the full lock-up zone. When the answer to step S12 is affirmative (YES), step S13 proceeds in which a target pressure differential dPr, which is suitable to a pressure differential of the lock-up clutch 2 during the beginning period of vehicle coasting, is calculated generally on the basis of input data namely the vehicle speed VSP and the throttle opening TVO. In step S14, input information data dPi is updated by the target pressure differential dPr calculated at step S13, and then one cycle of the main routine terminates. The updated input data dPi is used as input information data of a pressure-differential filter or an inverse filter which will be fully described later by reference to the flow chart indicated in FIG. 4. The pressure-differential filter is provided to improve dynamic characteristics of the control system of the lock-up clutch. When the answer to step S12 is in the negative (NO), and thus the lock-up clutch 2 is operated in the open converter zone, the procedure skips both steps S13 and S14 and then flows directly to the ending step. On the contrary, when the answer to step S11 is negative (NO), that is, the vehicle is out of the previously-noted transient state (during shifting to vehicle coast or during the beginning period of vehicle costing), step S15 occurs. In step S15, a test is made to determine whether the vehicle is now coasting. Actually, the microcomputer determines that the vehicle is now coasting, when, in both the previous and current execution cycles or routines, the input signal data from the coast switch 6 remains ON. When the answer to step S15 is negative (NO), that is, the vehicle is out of the coasting state, step S16 is entered. In other words, the procedure flows from step S15 to step S16 when the vehicle is driving with the coast switch turned OFF. In step S16, an internal variable of the pressure-differential filter is initialized by the lock-up capacity indicative input information data (corresponding to a lock-up clutch front-and-rear pressure-differential command value dP generated from the lock-up engagement/release section 7). Step S16 permits the pressure-differential filter to maintain at or shift to its inoperative state. The affirmative answer at step S15 means that the pressure-differential filter is operative during the vehicle coasting. Thus, during the previously-discussed transient state (during shifting to the vehicle coasting or during the beginning of vehicle coasting), the input information data or the input pressure-differential data dPi (updated by or replaced with the target pressure differential dPr) is calculated by way of the flow from step S11 via step S12 to step S13 in the main program. As can be appreciated, the input pressure-differential data dPi (updated by or replaced with the target pressure differential dPr) is derived in every continuous execution cycle, so that the temporarily-set target pressure-differential indicative data dPi is reduced in a stepwise manner in every execution cycles of the main routine shown in FIG. 3 during the beginning period of vehicle coasting.

Referring to FIG. 4, there is shown the pressure-differential reduction sub-routine for the lock-up clutch. The pressure-differential filter (or the inverse filter) is exemplified in a digital filter. The sub-routine shown in FIG. 4 is executed as time-triggered interrupt routines to be triggered every predetermined time intervals ($\Delta T$). The target pressure-differential indicative input information data dPi (updated by the target pressure differential dPr via steps S13 and S14 of FIG. 3) is used as input data sent to the pressure-differential filter or inverse filter (see a first step S17 indicated in FIG. 4). The pressure-differential change section 8 is aimed at the attainment of optimal change (or reduction in the shown embodiment) in engagement pressure (lock-up capacity) between input (pump impeller) and output (turbine runner) elements of the lock-up clutch, in which the optimal pressure-reduction is changeable in accordance with the power-train designer-selected dynamic characteristic or transfer characteristic. To achieve or satisfy the desired power-train designer-selected dynamic characteristic, the previously-noted pressure-differential filter or inverse filter is provided so that a pressure-differential command value is arithmetically calculated by means of the filtering process (see step S17 indicated in FIG. 4), during the pressure differential ($P_A-P_R$) is reducing. As detailed later, the pressure-differential filter is designed so that a response characteristic of the output of the lock-up clutch front-and-rear pressure-differential ($P_A-P_R$) relative to the target pressure-differential indicative input information data dPi coincides with the power-train designer-selected dynamic characteristic. Referring now to step S17, dPi is the input of the pressure-differential filter (digital filter), whereas dPo is the output from the pressure-differential filter. The ratio (dPo/dPi) of the output (dPo) to the input (dPi) for the filter is determined depending on predetermined constant coefficients $a_0$, $a_1$, $a_2$, $b_1$ and $b_2$ used in a predetermined function dPo=$\{(a_0+a_1z^{-1}+a_2z^{-2})/(1+b_1z^{-1}+b_2z^{-2})\}$dPi. These predetermined constant coefficients $a_0$, $a_1$, $a_2$, $b_1$ and $b_2$ are determined or calculated on trial-and-error basis in such a manner as to satisfy a particular condition where the pressure differential ($P_A-P_R$) can be rapidly reduced to a desired value without any overshoot (see undesired overshoot as indicated in FIG. 9. In step S17 (or the filtering process), the lock-up clutch front-and-rear pressure-differential command value dPo is calculated in accordance with the predetermined function dPo=$\{(a_0+a_1z^{-1}+a_2z^{-2})/(1+b_1z^{-1}+b_2z^{-2})\}$dPi on the basis of the input information data dPi. In the preferred embodiment, a transfer characteristic of the pressure-differential filter or an inverse filter is determined by both a transfer characteristic, which is obtained by step-response tests for the lock-up clutch engagement pressure or force correlated to the pressure differential ($P_A-P_R$), and a dynamic characteristic, which is determined depending upon a power-train designer-selected transfer characteristic, accounting for avoidance of unacceptable response-time delay, attenuation of release shock of the lock-up clutch at the time of transition to the release position, and prevention of undesired hunting (overshoot) of the system. Instep S18, the pressure-differential filter output (or the lock-up clutch front-and-rear pressure-differential command value dPo) is converted to a duty ratio D, and thereafter in step S19 a drive signal of the duty ratio D, which is determined through step S18, is output from a driver or drive circuit (not shown) included in the input/output interface (I/O) of the lock-up controller to the lock-up solenoid 4. As can be appreciated from the flow charts indicated in FIGS. 3 and 4, the processor of the lock-up controller 5 of the invention includes a detector for detecting the presence or absence of a command or demand of pressure-reduction for the lock-up clutch 2, that is, a demand of decrease in the pressure differential ($P_A-P_R$) (see steps S11 and S12 in FIG. 3). The processor of the lock-up controller 5 includes a setting circuit for setting a target lock-up clutch front-and-rear pressure differential dPr which is based on the command of pressure reduction for the lock-up clutch and is suitable to the beginning period of vehicle coasting (see steps S13 and S14 in FIG. 3). The processor of the lock-up controller 5 includes an arithmetic unit for calculating a lock-up clutch front-and-rear pressure-differential command value dPo by means of the previously-discussed inverse filter (see step S17 in FIG. 4). The processor of the lock-up controller 5 also includes a lock-up clutch front-and-rear pressure-differential regulation circuit being responsive to the filtered pressure-differential command value dPo for adjusting or regulating the front-and-rear pressure differential ($P_A-P_R$) of the lock-up clutch 2 (see steps S18 and S19 in FIG. 4). Preferably, the inverse filter capable of executing a specific arithmetic processing is constructed by a filtering unit whose dynamic characteristic is obtained by multiplying a dynamic characteristic of a low-pass filter tuned or matched to a desired response characteristic for the front-and-rear pressure differential ($P_A-P_R$) with an inverse system (or an inverse characteristic) of a low-pass filter having a dynamic characteristic being approximate to a transfer characteristic or dynamic characteristic of the previously-discussed lock-up clutch front-and-rear pressure-differential regulation circuit. In addition, it is preferable that a damping factor or attenuation factor of a desired dynamic characteristic of the lock-up control system is determined so that a transfer function of the lock-up control system is approximated to a second-order transfer function and so that a viscosity coefficient (or viscosity constant) $\zeta_{RL}$ of a transfer function calculated or determined on the basis of the power-train designer-selected dynamic characteristic is greater than a viscosity coefficient (or viscosity constant) $\zeta_{PL}$ indicative of a damping factor (or damping constant) of a damping characteristic of the transfer function of the lock-up control system.

In more detail, as discussed below, a filtering characteristic of the inverse filter of the embodiment is determined on the basis of both a lock-up clutch front-and-rear pressure-differential dynamic characteristic, which is predetermined and estimated through step-response tests for a response characteristic of an actual lock-up clutch front-and-rear pressure differential relative to a lock-up clutch pressure-differential command value, and an inverse system of a power-train designer-selected dynamic characteristic. First, the lock-up clutch front-and-rear pressure-differential dynamic characteristic $G_{PL}(s)$ is approximated to the following second-order lag system based on step-response simulation tests or experiments.

$$G_{PL}(s)=\omega^2_{nPL}/(s^2+2\zeta_{PL}\omega_{nPL}s+\omega^2_{nPL}) \qquad (1)$$

where $\omega_{nPL}$ denotes a natural frequency of the lock-up clutch front-and-rear pressure-differential dynamic characteristic estimated and predetermined by step-response tests, and $\zeta_{PL}$ denotes a damping factor of the predetermined lock-up clutch front-and-rear pressure-differential dynamic characteristic. Second, the power-train designer-selected dynamic characteristic $G_{RL}(s)$ is also expressed as the following second-order lag system, since the lock-up clutch front-and-rear pressure-differential dynamic characteristic $G_{PL}(s)$ is approximated to the above-mentioned second-order lag system (note that the denominator of the transfer function $G_{PL}(s)$ is represented as a quadratic expression with-respect to a parameter s).

$$G_{RL}(s)=\omega^2_{nRL}/(s^2+2\zeta_{RL}\omega_{nRL}s+\omega^2_{nRL}) \qquad (2)$$

where $\omega_{nRL}$ denotes a natural frequency of the power-train designer-selected dynamic characteristic predetermined in accordance with the power-train designer's wishes, and $\zeta_{RL}$ denotes a damping factor of the predetermined power-train designer-selected dynamic characteristic.

Accounting for prevention of undesired overshoot, a dynamic characteristic $G_L(s)$ of the inverse filter is expressed as the following equation (3) on the basis of both the dynamic characteristic $G_{PL}(S)$ based on step-response tests and the inverted system of the dynamic characteristic $G_{RL}(s)$ based on the power-train designer's wishes.

$$G_L(s)=(s^2+2\zeta_{RL}\omega_{nRL}s+\omega^2_{nRL})/(s^2+2\zeta_{PL}\omega_{nPL}s+\omega^2_{nPL}) \qquad (3)$$

For avoidance of undesired hunting (overshoot), it is preferable to set or determine the relationship between the viscosity coefficient or damping factor $\zeta_{PL}$ of the transfer function (or the dynamic characteristic) $G_{PL}(s)$ based on step-response tests and the viscosity coefficient or damping factor $\zeta_{RL}$ of the transfer function (or the dynamic characteristic) $G_{RL}(s)$ based on the power-train designer's wishes or hopes, according to the following inequality (4).

$$\zeta_{RL}>\zeta_{PL} \qquad (4)$$

As can be appreciated from the equation (3), the dynamic characteristic $G_L(s)$ of the inverse filter is represented as a continuous-time system whose inputs and outputs are capable of changing at any instant of time. For use in a so-called digital controller, the dynamic characteristic of the inverse filter must be represented as a discrete-time system on which signals at one or more points are capable of changing only at discrete values of time in place of the continuous-time system. In view of this, the transfer function $G_L(s)$ represented in the continuous-time system can be replaced with the following transfer function $G_L(z)$ in discrete-time system, by using a parameter z.

$$G_L(z)=(a_0+a_1z^{-1}+a_2z^{-2})/(1+b_1z^{-1}+b_2z^{-2}) \qquad (5)$$

Actually, in the filtering process of the inverse filter (see step S17 in FIG. 4), the lock-up clutch front-and-rear pressure-differential command value dPo is calculated as the product $G_L(s) \cdot dPi$ of the transfer function $G_L(z)$ of the discrete-time system and the target pressure-differential input information data dPi. Therefore, the pressure differential ($P_A-P_R$) of the lock-up clutch is adjusted in accordance with the lock-up clutch front-and-rear pressure-differential command value dPo (=$G_L(s) \cdot$ dPi) filtered through the inverse filter (step S17). The controller 5 outputs a driver signal of a duty ratio D based on the filtered or calculated pressure-differential command value dPo to the lock-up solenoid valve 4, so that the lock-up clutch front-and-rear pressure differential ($P_A$–$P_R$) is rapidly adjusted to the calculated pressure-differential command value without any overshoot, during the lock-up clutch release action such as might be caused from shifting to the vehicle coasting state. As discussed above, since the lock-up control system of the present invention includes the inverse filter, there is no overshoot, thus eliminating the demerit that the lock-up clutch is undesiredly released. Even if the lock-up control system of the embodiment using the inverse filter is applied to the previously-described advantageous control technique, in which, after a momentary drop of the pressure differential ($P_A$–$P_R$) toward a predetermined initial pressure differential ($\Delta P_O$) for a brief moment, a substantially linear pressure-differential drop continues at a given constant rate-of-change until a predetermined minimum pressure differential is reached, the control system of the embodiment can attain an optimal releasing operation of the lock-up clutch, while satisfying various requirements, namely attenuation in release shock of the lock-up clutch at the time of transition to the release position, avoidance of unacceptable response-time delay occurring as the result of an initial pressure differential set at a high level, and avoidance of hunting (overshoot) of the control system. As explained above, in the case that the lock-up front-and-rear pressure-differential filter is constructed by the above-mentioned digital filter being capable of executing the arithmetic processing shown in step S17 of FIG. 4, a CPU (or a processor) of a sufficient processor throughput must be used as the lock-up controller 5. Therefore, the inverse filtering means constructed by the digital filter is advantageous only for use in a lock-up controller employing a microcomputer of a sufficient processor throughput. Furthermore, as previously noted, if a transfer function of the lock-up control system is approximated to a second-order transfer function and additionally a viscosity coefficient (or viscosity constant) $\zeta_{RL}$ of a transfer function calculated or determined on the basis of the power-train designer-selected dynamic characteristic is greater than a viscosity coefficient (or viscosity constant) $\zeta_{PL}$ indicative of a damping factor (or damping constant) of a damping characteristic of the transfer function of the lock-up control system, the system of the embodiment can be suitably applied to the previously-described advantageous control technique, in which, after a momentary drop of the pressure differential ($P_A$–$P_R$) toward a predetermined initial pressure differential ($\Delta P_O$) for a brief moment, a substantially linear pressure-differential drop continues at a given constant rate-of-change until a predetermined minimum pressure differential is reached. That is to say, the damping characteristic of the lock-up front-and-rear pressure differential ($P_A$–$P_R$) can be greatly improved by way of synergetic effect of the use of the inverse filter and the magnitude relationship ($\zeta_{RL} > \zeta_{PL}$) of the two damping factors $\zeta_{PL}$ and $\zeta_{RL}$.

Figure 5:
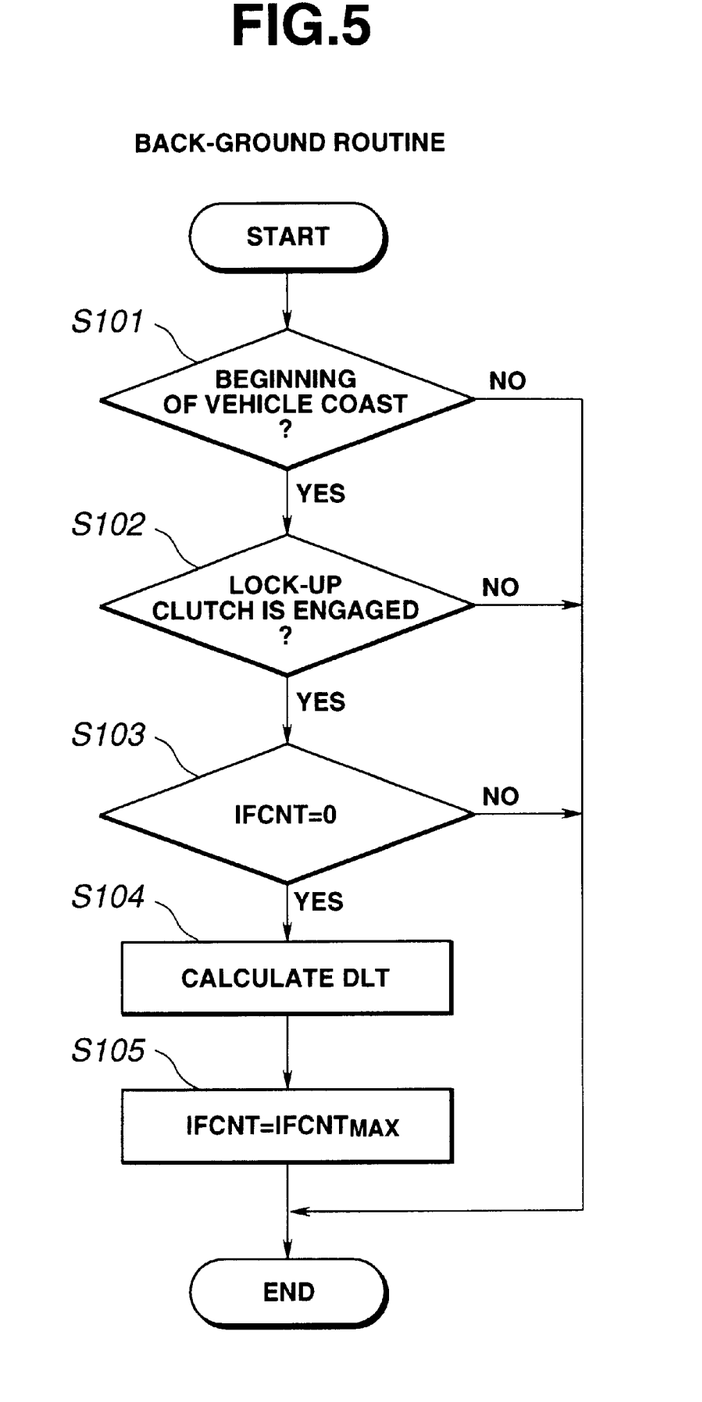
FIG. 5 is a flow chart illustrating a modification of a back-ground routine (or a modified main program) necessary for reduction in the pressure differential of the lock-up clutch.
Figure 6:
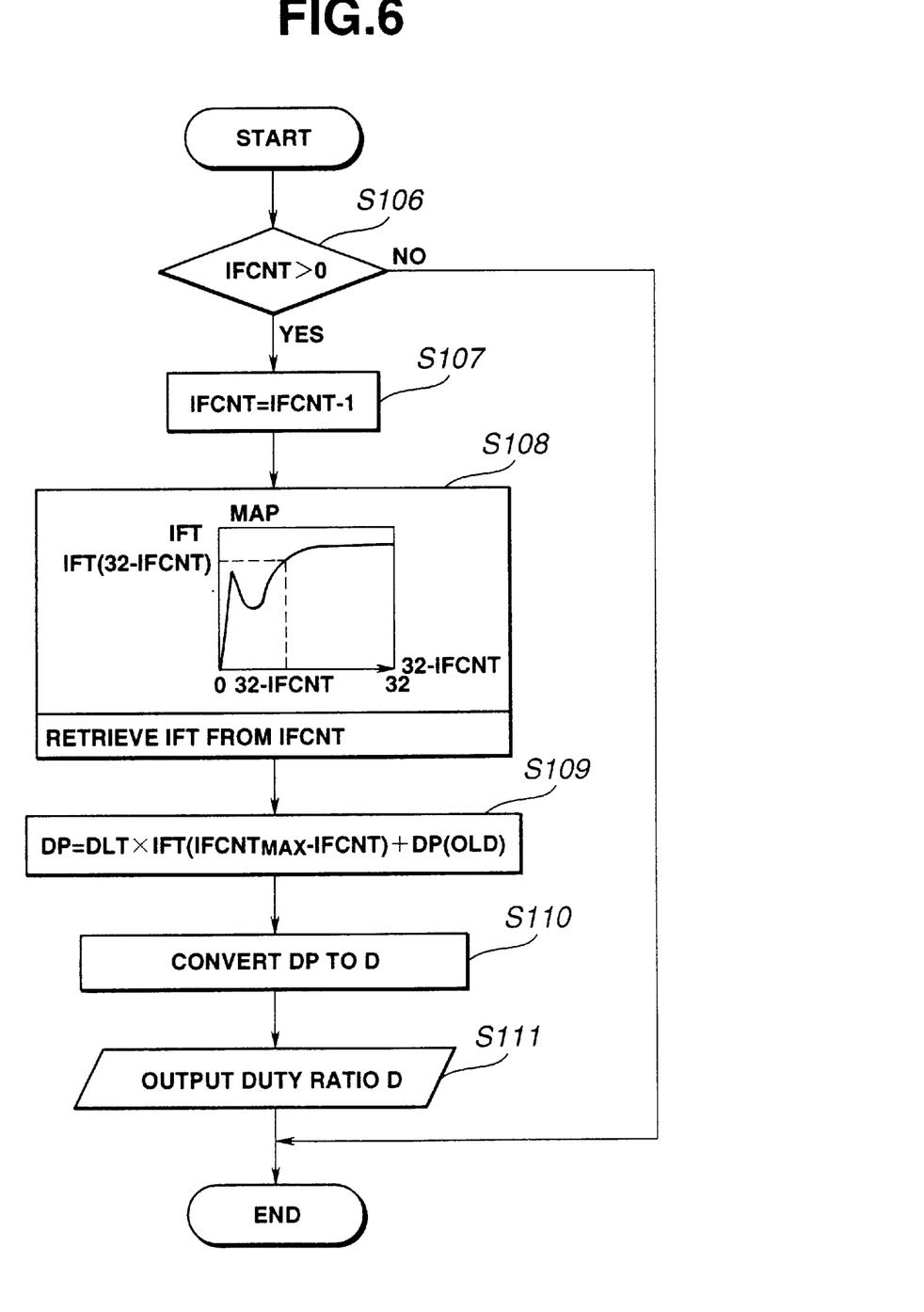
FIG. 6 is a flow chart illustrating a time-triggered interrupt sub-routine with respect to the modified main program shown in FIG. 5.
Figure 7:
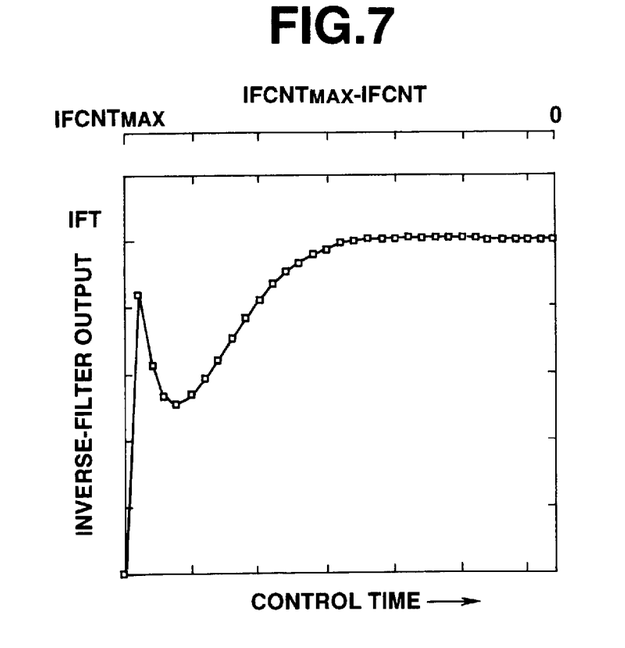
FIG. 7 is an enlarged gain map of the pressure-differential filter (the inverse filter), related to step S108 of FIG. 6.

Referring now to FIGS. 5 and 6, there is shown one modification of the lock-up control system of the present invention. The modified back-ground routine shown in FIG. 5 is somewhat similar to the back-ground routine shown in FIG. 3. In FIG. 5, steps S101 and S102 correspond to the respective steps S11 and S12 of FIG. 3. Referring to FIG. 6, there is shown a modified inverse-filter program or sub-routine which is executed as time-triggered interrupt routines every predetermined time intervals such as $\Delta T$. The modified system executing arithmetic processing shown in FIGS. 5 and 6 is different from the system having the digital filter (see step S17 of FIG. 4), in that the gain map (the look-up table) as indicated in step S108 of FIG. 6 is used in place of arithmetic calculation performed in the digital filter, that is, an input waveform (a pressure-buildup waveform or pressure-reduction waveform in the pressure differential ($P_A$–$P_R$)) of the inverse filter is regulated to a predetermined or pre-programmed input waveform, preferably a stepped input waveform, and outputs of the inverse filter are predetermined in every step number of the stepped input data and stored in the memory of the microcomputer as an inverse-filter output (IFT) versus control time (the step number or the count value of a sequence counter) as indicated in FIG. 7. The construction of the inverse filter of the modified system corresponds to a sequence control by virtue of information retrieval from the predetermined gain map (see FIG. 7).

Referring now to FIG. 5, when the answers to steps S101 and S102 are both affirmative (YES), that is, the reduction instruction of the pressure differential is detected, step S103 occurs. Instep S103, a check is made to determine whether the inverse-filter program shown in FIG. 6 has been already executed. The check of step S103 is performed by monitoring a count value IFCNT of a lock-up front-and-rear pressure-differential sequence counter and by comparing the count value IFCNT with "0". The count value IFCNT of the sequence counter is set at a predetermined maximum value IFCNT$_{MAX}$ at step S105. Then, in sub-routine shown in FIG. 6, the count value IFCNT is used at the decision box or decision step S106 necessary for determining whether a predetermined condition of IFCNT >0 is satisfied. Thereafter, in step S107, the count value IFCNT is decremented by "1" (see the equation IFCNT=IFCNT−1) in every predetermined time interval such as $\Delta T$. That is, the sequence counter is comprised of a so-called down counter. Returning to step S103, when the answer to step S103 is in the affirmative (YES), that is, the condition of IFCNT=0 is satisfied, the microcomputer determines that the lock-up front-and-rear pressure-differential inverse filter is inoperative. In case that step S103 determines that the condition of IFCNT=0 is satisfied, step S104 proceeds in which a variable DLT of target pressure differential (i.e., a decreasing amount of the pressure differential) is temporarily calculated in a similar manner as step S13 of FIG. 3. Then, in step S105, the current sequence-counter count value IFCNT, which is obtained as the result of ongoing arithmetic calculation, is updated by the predetermined maximum value IFCNT$_{MAX}$. At the time of completion of step S105, the operation of the lock-up front-and-rear pressure-differential inverse filter is started. As appreciated from the inverse-filter gain map shown in step S108, the maximum value IFCNT$_{MAX}$ corresponds to a predetermined maximum step number such as 32. As may be appreciated, one pressure-reducing operation of the lock-up clutch (precisely one cycle of reducing mode of pressure-differential ($P_A$–$P_R$) of the lock-up clutch) requires a time duration which is given as the product (IFCNT$_{MAX}$×$\Delta T$) of the maximum value IFCNT$_{MAX}$ and the arithmetic-calculation time period (corresponding to the time interval $\Delta T$ between two continuous time-triggered filter routines, in other words, the length between the two adjacent steps of the stepped input data (32-IFCNT) in step S108 of FIG. 6) of a pressure-differential command value DP which is fully explained later. An example of the gain map of the inverse filter is indicated in FIG. 7. The gain map data is obtained according to the following method. That is, the output data of the filter, which is obtained by changing the input data of the filter by a unit quantity, is stored in the associated memory address of the computer memory as a lock-up front-and-rear pressure-differential basic command value in every predetermined time interval. The stored data is used as the gain map data and retrieved from the memory for arithmetic calculation of the pressure-differential command value (see the equation (6) described later). Preferably, the above-mentioned predetermined time interval is set to be equal to the predetermined interval $\Delta T$ of the arithmetic processing shown in FIG. 6. In FIG. 7, the inverse-filter output IFT corresponds to the lock-up front-and-rear pressure-differential basic command value. The filter output data IFT are able to be pre-stored or pre-programmed as a filter gain map in the memory addresses of the memory of the controller 5, so that there is one-to-one correspondence between the pressure-differential basic command values (IFT) and the count values (0, 1, 2, . . . , (32–IFCNT), . . . , 32) of the inverse-filter sequence counter in synchronization with a start time of the control operation of the system. As seen in step S108 of FIG. 6, the pressure-differential basic command value IFT is represented as the function IFT(IFCNT$_{MAX}$–IFCNT) of the subtraction value (IFCNT$_{MAX}$–IFCNT). In the embodiment having the inverse filter shown in FIG. 4, when a step input from an input value "0" to an input value "1" is applied at the time of "0" in the previously-noted equations (3) or (5), the filter gain map data can be obtained by arithmetically computing or calculating the step response every sampling time intervals, and stored in the memory addresses.

Referring to FIG. 6, in step S106, a check is made to determine whether the count value IFCNT of the sequence counter is greater than "0". The condition of IFCNT >0 means that the inverse filter has been already started. When the answer to step S106 is affirmative, i.e., in case of IFCNT >0, step S107 is entered. Conversely, when the answer to step S106 is negative, i.e., in case of IFCNT=0, the microcomputer determines that the arithmetic operation of the filter is not yet started or the arithmetic operation of the filter has been completed, and then the procedure ends. In the sub-routine shown in FIG. 6, steps S107 through S109 corresponds to the arithmetic operation of the inverse filter. Steps S110 and S111 essentially corresponds to the lock-up clutch front-and-rear pressure-differential regulation circuit as discussed in the embodiment (see steps S18 and S19 in FIG. 4). In step S107, the previous count value IFCNT of the sequence counter is updated by the current count value IFCNT-1, that is, the count value is decremented by "1" via the ongoing arithmetic calculation. The count value IFCNT of the sequence counter indicates an elapsed time measured from initiation of the arithmetic calculation of the inverse filter, and the operating condition of the filter is monitored by the count value IFCNT. In step S108, a pressure-differential basic command value IFT(IFCNT$_{MAX}$–IFCNT) corresponding to the ongoing count value IFCNT of the sequence counter, is retrieved from the predetermined filter gain map (see FIG. 7) on the basis of the subtraction value (IFCNT$_{MAX}$–IFCNT) between the predetermined step number IFCNT$_{MAX}$ and the ongoing count value or the elapsed time IFCNT. When the count value is IFCNT, the corresponding value IFT(IFCNT$_{MAX}$–IFCNT) of the function is an output gain of the inverse filter. In the sub-routine shown in FIG. 6, the function IFT(IFCNT$_{MAX}$–IFCNT) is represented as IFT(32–IFCNT), since the IFCNT$_{MAX}$ is set at a predetermined positive integer "32". As may be appreciated, calculation of the filter output gain IFT(32–IFCNT) is repeatedly executed in every time-triggered interrupt sub-routine and the gain IFT is repeatedly read from the gain map in accordance with the sequential order of the stored filter output data, until the condition of IFCNT=0 is satisfied in step S106. Subsequently, in step S109, a current pressure-differential command value DP is calculated from the following expression (6) on the basis of a pressure-differential command value DP(OLD) occurring just before initiation of a change mode of the pressure differential $(P_A-P_R)$ (or occurring just before a decrease mode of the pressure differential in the embodiment), the gain IFT(IFCNT$_{MAX}$–IFCNT) given by step S108, and the target pressure-differential variable DLT given by step S104.

$$DP = DLT \cdot IFT(IFCNT_{MAX} - IFCNT) + DP(OLD) \qquad (6)$$

where DP denotes a lock-up clutch front-and-rear pressure-differential command value, DLT denotes a target pressure-differential variable which is less than "0" in case of a decreasing mode of the pressure differential $(P_A-P_R)$ and greater than "0" in case of an increasing mode of the pressure differential, IFT(IFCNT$_{MAX}$–IFCNT) denotes a gain of the lock-up front-and-rear pressure-differential inverse filter or a filter output, IFCNT denotes a count value of the sequence counter or a filter input, and DP(OLD) denotes a pressure-differential command value DP (OLD) occurring just before initiation of a change mode of the pressure differential $(P_A-P_R)$.

As set forth above, the final pressure-differential command value DP is calculated by adding the pressure-differential command value DP(OLD) to the product of the stored data IFT(IFCNT$_{MAX}$–IFCNT) read from the gain map and the target pressure-differential variable DLT. In step S110, the calculated pressure-differential command value DP is converted to a duty ratio D. Then, a driver signal of the calculated duty ratio D is output to the lock-up solenoid valve 4. Therefore, the waveform of the gain IFT(32–IFCNT) or the waveform of the calculated pressure-differential command value DP correlates with the output waveform of the duty ratio D shown in FIG. 8. In place of the filtering process executed in step S17 of the first embodiment, the input waveform of the filter is regulated to a specified input waveform such as a stepped input waveform, and the output waveform to the input waveform is pre-programmed and pre-stored in the memory of the controller 5, and the pressure-differential command value DP is derived by virtue of simple information retrieval of the filter output IFT to the filter input IFCNT from the predetermined or prestored data map in the modified routines 5 and 6. In comparison with the digital filter (see step S17), although the filter of the modification capable of executing the arithmetic calculations of steps S107, S108 and S109 is cheap, the modified filter can provide overshoot-elimination effect in the same manner as the digital filter. The arithmetic calculations of the modified filter are able to be executed by a microcomputer of a small processor throughout, thus reducing production costs of the lock-up control system.

Figure 8:
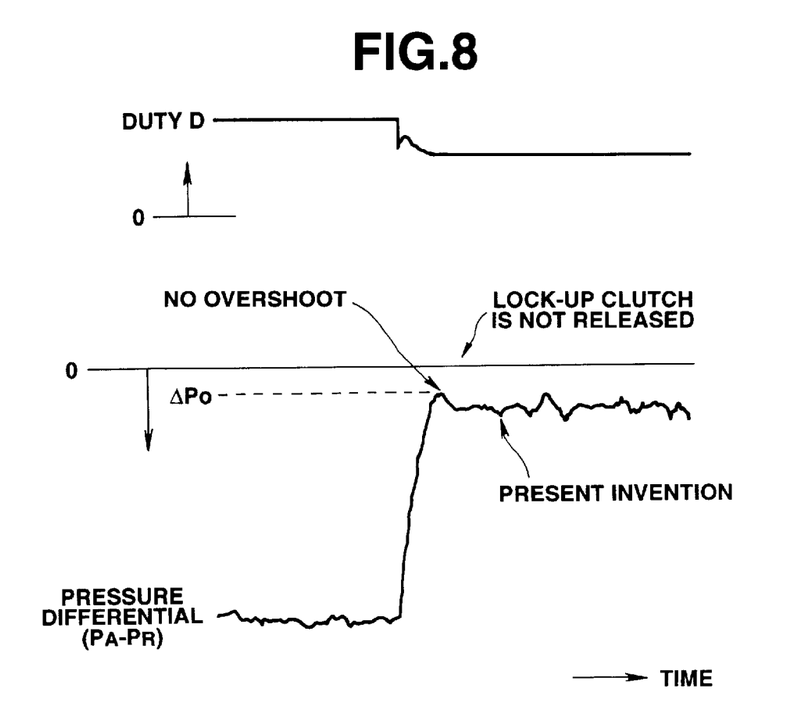
FIG. 8 is a timing chart illustrating an output waveform of the pressure differential ($P_A - P_R$), indicating a step-response characteristic given according to the lock-up control of the modified system shown in FIGS. 5–7.

FIG. 8 shows step-response simulation results obtained by the system of the present invention employing a pressure-differential filter (an inverse filter), whereas FIG. 9 shows step-response simulation results obtained by the conventional system not employing a pressure-differential filter. The simulation test shown in FIG. 9 is performed under a condition in which the lock-up front-and-rear pressure-differential is dropped instantly to a predetermined initial pressure differential $\Delta P_0$ according to a rapid stepped change in duty ratio D at the same time of initiation of a reduction instruction of the pressure differential (or a release instruction of the lock-up clutch). As seen in FIG. 9, there is overshoot exceeding the predetermined initial pressure differential $\Delta P_0$. As the time of occurrence of overshoot, the lock-up clutch is undesiredly released. On the other hand, the simulation test of FIG. 8 shows the regulated or controlled output waveform of the duty ratio D based on the filtering process shown in FIGS. 5 and 6. As seen in FIG. 8, in case of the system of he present invention, there is no overshoot owing to the properly-regulated duty-ratio output waveform which is obtained by virtue of the filtering process shown in steps S107–S109 of FIG. 6, thus preventing the lock-up clutch from being released undesiredly. Thus, even if the above-mentioned system having the modified filter is also applied to the previously-described advantageous control technique, in which, after an instant drop of the pressure differential $(P_A-P_R)$ toward a predetermined initial pressure differential $(\Delta P_0)$ which never results in release shocks of the lock-up clutch, a substantially linear pressure-differential drop continues at a given constant rate-of-change until a predetermined minimum pressure differential is reached, the modified system can attain an optimal releasing operation of the lock-up clutch, while satisfying various requirements, namely attenuation in release shock of the lock-up clutch, avoidance of unacceptable response-time delay and overshoot. Also, it is more preferable to regulate the input waveform to the stepped input waveform when the above-mentioned system having the modified filter is applied to the previously-described advantageous control technique. As previously-noted, if sampling operations are executed every predetermined arithmetic-calculation time period $\Delta T$ such that a sampling time interval is identical to the time period $\Delta T$ when sampling a gain map data necessary for the pressure-differential filter (the inverse filter), the stored pressure-differential basic command value indicative data can be smoothly read and used every arithmetic calculation time periods $\Delta T$. This enhances an accuracy of arithmetic calculation of the pressure-differential command value. In the shown embodiments, although the lock-up control system is utilized for an optimal decreasing control of a pressure-differential $(P_A-P_R)$ of a lock-up clutch, it will be appreciated that the fundamental concept of the present invention can be applied to an optimal increasing control of the pressure differential $(P_A-P_R)$. Also, although the system of the embodiment is exemplified in a decrease control in the pressure differential during the beginning period of vehicle coasting, the system of the invention may be applied to the other transient engine/vehicle conditions which may require an optimal build-up control of the pressure differential $(P_A-P_R)$ as well as an optimal pressure-differential reduction.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A control system for controlling a lock-up clutch of a torque converter employed in an automatic transmission of a vehicle, said lock-up clutch being controllable by a pressure differential $(P_A-P_R)$ between an apply pressure $(P_A)$ which is applied in a direction of engagement of the lock-up clutch and a release pressure $(P_R)$ which is applied in a direction of release of the lock-up clutch, said system comprising:

a detector for detecting a demand of change in the pressure differential $(P_A-P_R)$ between the apply and release pressures;

a pressure-differential setting circuit for setting target pressure-differential input data (dPi; DLT) in response to the demand of change in the pressure differential;

a pressure-differential filter having a desired dynamic characteristic and being responsive to said target pressure-differential input data (dPi; DLT) for outputting a filtered pressure-differential command value (dPo; DP) via a filtering process based on said desired dynamic characteristic; and a pressure-differential regulation circuit being connected to said pressure-differential filter for receiving said filtered pressure-differential command value (dPo; DP) as an input information data to generate an output (D) and for regulating the pressure differential $(P_A-P_R)$ in accordance with said output (D), wherein said pressure-differential filter comprises an inverse filter whose desired dynamic characteristic $(G_L(s)=(s^2+2\zeta_{RL}\omega_{nRL}s+\omega^2_{nRL})/(s^2+2\zeta_{PL}\omega_{nPL}s+\omega^2_{nPL}))$ is obtained by multiplying a first dynamic characteristic $(G_{PL}(s)=\omega^2_{nPL}/(s^2+2\zeta_{PL}\omega_{nPL}s+\omega^2_{nPL}))$ of a first low-pass filter matched to a desired response characteristic for the pressure differential $(P_A-P_R)$ with an inverse system of a second low-pass filter having a second dynamic characteristic $(G_{RL}(s)=\omega^2_{nRL}/(s^2+2\zeta_{RL}\omega_{nRL}s+\omega^2_{nRL}))$ being approximate to a transfer characteristic of said pressure-differential regulation circuit.

2. A control system for controlling a lock-up clutch of a torque converter employed in an automatic transmission of a vehicle, said lock-up clutch being controllable by a pressure differential $(P_A-P_R)$ between an apply pressure $(P_A)$ which is applied in a direction of engagement of the lock-up clutch and a release pressure $(P_R)$ which is applied in a direction of release of the lock-up clutch, said system comprising:

a detector for detecting a demand of change in the pressure differential $(P_A-P_R)$ between the apply and release pressures;

a pressure-differential setting circuit for setting target pressure-differential input data (dPi; DLT) in response to the demand of chance in the pressure differential;

a pressure-differential filter having a desired dynamic characteristic and being responsive to said target pressure-differential input data (dPi; DLT) for outputting a filtered pressure-differential command value (dPo; DP) via a filtering process based on said desired dynamic characteristic: and a pressure-differential regulation circuit being connected to said pressure-differential filter for receiving said filtered pressure-differential command value (dPo; DP) as an input information data to generate an output (D) and for regulating the pressure differential $(P_A-P_R)$ in accordance with said output (D), wherein said pressure-differential setting circuit includes a waveform regulation unit for regulating an input waveform of input data of said pressure-differential filter to a pre-programmed input waveform, and a memory for storing output data of said pressure-differential filter in an associated memory address as a pressure-differential basic command value (IFT (IFCNT$_{MAX}$–IFCNT)) in every predetermined time interval, said output data being obtained by changing the input data of said pressure-differential filter by a unit quantity.

3. The control system as set forth in claim 2, wherein said predetermined time interval of said memory means is identical to a time interval ($\Delta T$) of an arithmetic calculation of the filtered pressure-differential command value (dPo; DP).

4. The control system as set forth in claim 2, wherein said pressure-differential filter reads the pressure-differential basic command value (IFT(IFCNT$_{MAX}$−IFCNT)) in accordance with a sequential order of the output data stored in said memory means and calculates said filtered pressure-differential command value (dPo; DP) based on a product of the pressure-differential basic command value (IFT (IFCNT$_{MAX}$−IFCNT)) and the target pressure-differential input data (dPi, DLT) set by said pressure-differential setting circuit.

5. The control system as set forth in claim 2, wherein said input waveform of input data of said pressure-differential filter is regulated to a stepped input waveform.

6. A control system for controlling a lock-up clutch of a torque converter employed in an automatic transmission of a vehicle, said lock-up clutch being controllable by a pressure differential ($P_A$−$P_R$) between an apply pressure ($P_A$) which is applied in a direction of engagement of the lock-up clutch and a release pressure ($P_R$) which is applied in a direction of release of the lock-up clutch, said system comprising:

a detector for detecting a demand of chance in the pressure differential ($P_A$−$P_R$) between the apply and release pressures;

a pressure-differential setting circuit for setting target pressure-differential input data (dPi; DLT) in response to the demand of chance in the pressure differential;

a pressure-differential filter having a desired dynamic characteristic and being responsive to said target pressure-differential input data (dPi; DLT) for outputting a filtered pressure-differential command value (dPo; DP) via a filtering process based on said desired dynamic characteristic; and a pressure-differential regulation circuit being connected to said pressure-differential filter for receiving said filtered pressure-differential command value (dPo; DP) as an input information data to generate an output (D) and for regulating the pressure differential ($P_A$−$P_R$) in accordance with said output (D), wherein said pressure-differential filter comprises an inverse filter whose desired dynamic characteristic ($G_L$(s)=($s^2$+2$\zeta_{RL}\omega_{nRL}$s+$\omega^2_{nRL}$)/($s^2$+2$\zeta_{PL}\omega_{nPL}$s+$\omega^2_{nPL}$)) is obtained by multiplying a first dynamic characteristic $G_{PL}$(s)=$\omega^2_{nPL}$/($s^2$+2$\zeta_{PL}\omega_{nPL}$s+$\omega^2_{nPL}$)) of a first low-pass filter matched to a desired response characteristic for the pressure differential ($P_A$−$P_R$) with an inverse system of a second low-pass filter having a second dynamic characteristic ($G_{RL}$(s)=$\omega^2_{nRL}$/($s^2$+2$\zeta_{RL}\omega_{nRL}$s+$\omega^2_{nRL}$)) being approximate to a transfer characteristic of said pressure-differential regulation circuit, and wherein a damping factor of the desired dynamic characteristic of said pressure-differential filter is determined so that a transfer function of the pressure-differential filter is approximated to a second-order transfer function and so that a first viscosity coefficient ($\zeta_{RL}$) of a transfer function calculated from a power-train designer-selected dynamic characteristic is greater than a second viscosity coefficient ($\zeta_{PL}$) indicative of a damping factor of a damping characteristic of a transfer function of the control system.

7. A control system for controlling a lock-up clutch of a torque converter employed in an automatic transmission of a vehicle, said lock-up clutch being controllable by a pressure differential ($P_A$−$P_R$) between an apply pressure ($P_A$) which is applied in a direction of engagement of the lock-up clutch and a release pressure ($P_R$) which is applied in a direction of release of the lock-up clutch, said system comprising:

a detector for detecting a demand of chance in the pressure differential ($P_A$−$P_R$) between the apply and release pressures;

a pressure-differential setting circuit for setting target pressure-differential input data (dPi; DLT) in response to the demand of change in the pressure differential;

a pressure-differential filter having a desired dynamic characteristic and being responsive to said target pressure-differential input data (dPi; DLT) for outputting a filtered pressure-differential command value (dPo; DP) via a filtering process based on said desired dynamic characteristic; and a pressure-differential regulation circuit being connected to said pressure-differential filter for receiving said filtered pressure-differential command value (dPo; DP) as an input information data to generate an output (D) and for regulating the pressure differential ($P_A$−$P_R$) in accordance with said output (D), wherein said pressure-differential filter comprises an inverse filter whose desired dynamic characteristic ($G_L$(s)=($s^2$+2$\zeta_{RL}\omega_{nRL}$s+$\omega^2_{nRL}$)/($s^2$+2$\zeta_{PL}\omega_{nPL}$s+$\omega^2_{nPL}$)) is obtained by multiplying a first dynamic characteristic $G_{PL}$(s)=$\omega^2_{nPL}$/($s^2$+2$\zeta_{PL}\omega_{nPL}$s+$\omega^2_{nPL}$)) of a first low-pass filter matched to a desired response characteristic for the pressure differential ($P_A$−$P_R$) with an inverse system of a second low-pass filter having a second dynamic characteristic ($G_{RL}$(s)=$\omega^2_{nRL}$/($s^2$+2$\zeta_{RL}\omega_{nRL}$s+$\omega^2_{nRL}$)) being approximate to a transfer characteristic of said pressure-differential regulation circuit, and wherein the dynamic characteristic of said first low-pass filter matched to a desired response characteristic for the pressure differential ($P_A$−$P_R$) is expressed by a transfer function $G_{PL}$(s)=$\omega^2_{nPL}$/($s^2$+2$\zeta_{PL}\omega_{nPL}$s+$\omega^2_{nPL}$), where s denotes a Laplacian, $\omega_{nPL}$ denotes a natural frequency of a pressure-differential dynamic characteristic estimated by a step-response test, and $\zeta_{PL}$ denotes a damping factor of the pressure-differential dynamic characteristic estimated, and wherein a dynamic characteristic of said second low-pass filter having a dynamic characteristic being approximate to a transfer characteristic of said pressure-differential regulation circuit is expressed by a transfer function $G_{RL}$(s)=$\omega^2_{nRL}$/($s^2$+2$\zeta_{RL}\omega_{nRL}$s+$\omega^2_{nRL}$), where s denotes a Laplacian, $\omega_{nRL}$ denotes a natural frequency of a power-train designer-selected dynamic characteristic, and $\zeta_{RL}$ denotes a damping factor of the power-train designer-selected dynamic characteristic, and wherein the desired dynamic characteristic of said inverse filter is expressed by a transfer function $G_L$(s)=($s^2$+2$\zeta_{RL}\omega_{nRL}$s+$\omega^2_{nRL}$)/($s^2$+2$\zeta_{PL}\omega_{nPL}$s+$\omega^2_{nPL}$).

* * * * *